(12) United States Patent  
Melvin, Jr. et al.

(10) Patent No.: US 7,084,783 B1  
(45) Date of Patent: Aug. 1, 2006

(54) ELECTRONIC METER WITH ENHANCED THERMALLY MANAGED COMMUNICATIONS SYSTEMS AND METHODS

(75) Inventors: Waymon A. Melvin, Jr., Raleigh, NC (US); Lars A. Lindqvist, Apex, NC (US); Charles Cunningham, Jr., Raleigh, NC (US); Michael A. Murphy, Raleigh, NC (US); Kenneth C. Shuey, Zebulon, NC (US)

(73) Assignee: Elster Electricity, LLC, Raleigh, NC (US)

( * ) Notice: Subject to any disclaimer, the term of this patent is extended or adjusted under 35 U.S.C. 154(b) by 352 days.

(21) Appl. No.: 10/217,397

(22) Filed: Aug. 13, 2002

(51) Int. Cl.
*G08B 23/00* (2006.01)
*G08C 15/06* (2006.01)

(52) U.S. Cl. .................. 340/870.02; 375/219; 455/557; 370/487

(58) Field of Classification Search ............... 340/870.02–870.11; 375/219; 455/557; 370/487
See application file for complete search history.

(56) References Cited

U.S. PATENT DOCUMENTS

| | | | |
|---|---|---|---|
| 4,312,192 A * | 1/1982 | Zarudiansky et al. ......... 62/51.1 |
| 4,614,945 A | 9/1986 | Brunius et al. ......... 340/870.03 |
| 4,795,975 A | 1/1989 | Cox ........................... 324/156 |
| 4,886,560 A * | 12/1989 | Cartwright .................... 149/12 |
| 4,940,976 A * | 7/1990 | Gastouniotis et al. ... 340/870.02 |
| 4,998,102 A | 3/1991 | Wyler et al. ........... 340/870.02 |
| 5,056,107 A | 10/1991 | Johnson et al. ................. 375/1 |
| 5,122,735 A * | 6/1992 | Porter et al. ................. 324/142 |
| 5,140,259 A | 8/1992 | Aida .......................... 324/156 |
| 5,161,182 A * | 11/1992 | Merriam et al. ........ 379/106.07 |
| 5,553,094 A | 9/1996 | Johnson et al. ............. 375/200 |
| 5,659,300 A | 8/1997 | Dresselhuys et al. .. 340/870.02 |
| 5,748,104 A | 5/1998 | Argyroudis et al. ... 340/870.11 |
| 5,963,146 A | 10/1999 | Johnson et al. ........ 340/870.01 |
| 6,016,432 A | 1/2000 | Stein .......................... 455/557 |
| 6,067,029 A | 5/2000 | Durston ................. 340/870.03 |
| 6,100,817 A | 8/2000 | Mason, Jr. et al. ..... 340/870.02 |
| 6,150,955 A | 11/2000 | Tracy et al. ........... 340/870.02 |
| 6,172,616 B1 | 1/2001 | Johnson et al. ........ 340/870.12 |
| 6,181,294 B1 | 1/2001 | Porter et al. ................. 343/859 |
| 6,246,677 B1 | 6/2001 | Nap et al. .................... 370/346 |

OTHER PUBLICATIONS

TOP 232-234: *TopSwitch® -FX Family: Design Flexible, EcoSmart®, Integrated Off-Line Switcher*, Power Integrations, Inc., Jul. 2001.

* cited by examiner

*Primary Examiner*—Jeffery Hofsass
*Assistant Examiner*—Kimberly Jenkins
(74) *Attorney, Agent, or Firm*—Woodcock Washburn LLP

(57) ABSTRACT

An electronic meter that is capable of handling an analog cellular phone or radio modem under the meter cover provides significant improvements in the thermal management and power handling that is associated with a circuit switched wireless device. The electronic meter comprises a power supply capable of delivering the transmitter power plus the associated losses due to transmitter efficiency. It is desirable to deliver the high power over a wide range of AC input voltages (typically from about 90 to 530 VAC). The meter packaging allows the power supply and the analog cellular modem to operate in an enclosed metering package without exceeding the operating temperatures of the electronic components. The packaging adapts to increased steady state (idle) conditions as well as increased transmit conditions.

18 Claims, 10 Drawing Sheets

ELECTRONIC METER WITH ENHANCED THERMALLY MANAGED COMMUNICATIONS SYSTEMS AND METHODS

FIELD OF THE INVENTION

This invention relates in general to the field of electronic meters, and more particularly, this invention relates to thermal management of electronic meters.

BACKGROUND OF THE INVENTION

Electronic meters are becoming more and more sophisticated in order to achieve the operational characteristics that are being required by utility customers. Associated with the increased sophistication of the products is an increasing need to extract timely information from the electronic meters via communication devices. In many situations, customers are requiring that meters include wireless communications modems for the delivery of data to and from the meter.

Most wireless modems operate on a packet basis where the wireless device can connect on command and send a short burst of data to the headend computer. The transmit time is minimized and the associated power requirements of the packet radio can be delivered by storage elements that are charged from a reduced capacity power supply. However, the existing nationwide coverage of packet networks is less than universal. The limitations in coverage of packet networks creates a need to supply electronic meters with analog cellular wireless modems, which provides nearly 100% system access via the nationwide analog cellular infrastructure.

In the past, analog cellular communications with meters has been accomplished exclusively with external boxes that are coupled to the logic of electronic meters. These external boxes present significant problems for utilities because special power runs and logic wiring is needed to adapt to communications devices that are not integral to the meter. The external boxes tend to be bulky and in general are disliked by utility metering personnel.

There have been some electronic meters that have adapted packet type radio modems under the cover of the meter. However, due to the power and thermal issues associated with analog cellular, no electronic meters have been designed with an integral analog cellular modem.

In view of the foregoing, there is a need for systems and methods that overcome the limitations and drawbacks of the prior art.

SUMMARY OF THE INVENTION

The present invention is directed to a single phase or polyphase electronic meter that comprises an analog cellular phone or radio modem (referred to herein as an analog cellular modem) under the meter cover. The present invention provides significant improvements in the thermal management and power handling that is associated with such a circuit switched wireless device.

One embodiment of the present invention is directed to an electronic meter that comprises a power supply capable of delivering the transmitter power plus the associated losses due to transmitter efficiency. The meter is capable of delivering the high power over a wide range of AC input voltages (typically from about 90 to 530 VAC).

Another aspect of the present invention is the meter packaging that allows the power supply and the analog cellular modem to operate in an enclosed metering package without exceeding the operating temperatures of the electronic components. The packaging adapts to increased steady state (idle) conditions as well as increased transmit conditions.

Another aspect of the present invention is an analog cellular modem under the meter cover that has an external antenna remote from the meter. This allows for hard to reach RF conditions to be met by incorporating an isolated antenna interface circuit. The isolation circuit guarantees that the external antenna will not have the personnel risk associated with being at AC potential.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

The present invention is directed to an electronic energy meter comprising an analog cellular modem under its cover. The term "analog cellular modem" can include, but is not limited to, a cellular radio and a modem board. The meter comprises a power supply that is capable of delivering the transmitter power plus the associated losses due to transmitter efficiency. For a 600 mW radio, for example, nearly 3 W of delivered output is desirably available from the power supply. Because of the analog cellular modem and the associated circuit switched connection, the total transmit time can approach 10 minutes or more. Due to this long connection and transmission time, it is desirable to provide heat dissipation components. With the meter of the present invention, it is desirable to deliver the high power over a wide range of AC input voltages (typically from about 90 to 530 VAC).

The power supply and the analog cellular modem operate in an enclosed metering package without exceeding the operating temperatures of the electronic components. The packaging adapts to increased steady state (idle) conditions as well as increased transmit conditions.

The analog cellular modem under the meter cover can have an external antenna remote from the meter so that hard to reach RF (radio frequency) conditions can met by incorporating an isolated antenna interface circuit. The isolation circuit guarantees that the external antenna will not have the personnel risk associated with being at AC potential.

Figure 1:
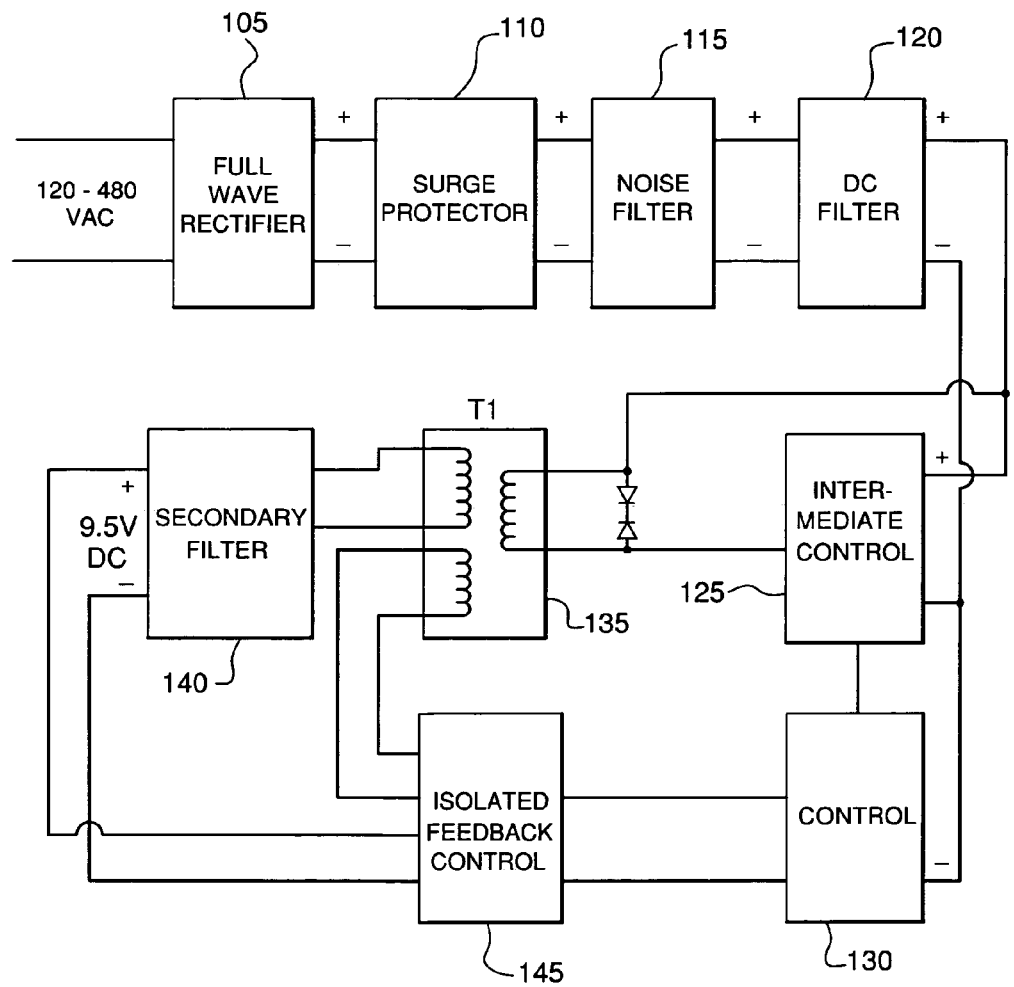
FIG. 1 is a block diagram of an exemplary power supply in accordance with the present invention.
Figure 2:
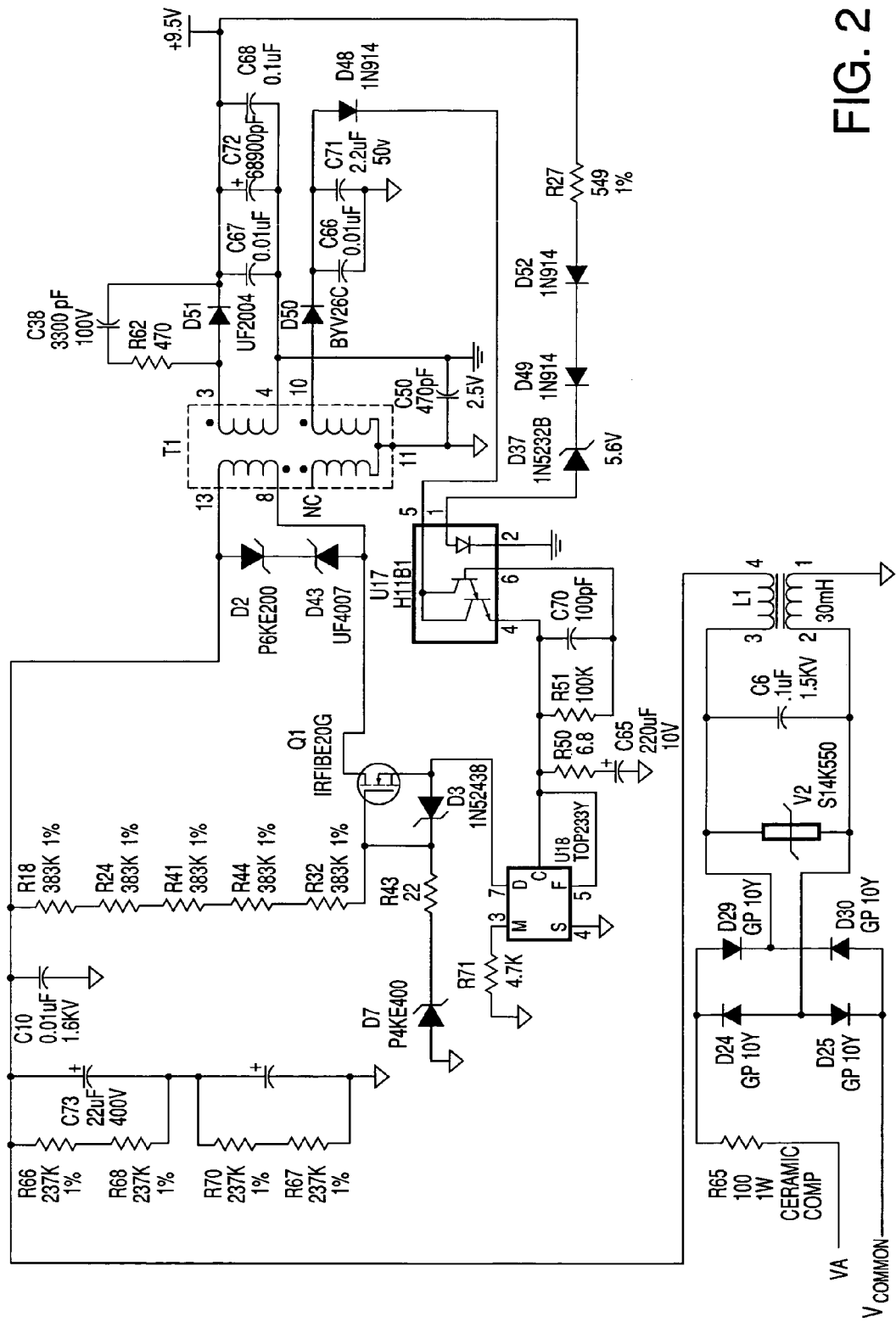
FIG. 2 is a schematic circuit diagram of an exemplary power supply in accordance with the present invention.

FIG. 1 is a block diagram of an exemplary power supply in accordance with the present invention, and FIG. 2 is a schematic circuit diagram of an exemplary power supply.

As shown in FIG. 1, and described in further detail below with respect to FIG. 2, an input voltage (e.g., between about 120 and 480 VAC, which with typical tolerances is between about 90 and 530 VAC) is provided to a full wave rectifier 105. The rectified signal is provided to a surge protector 110 and noise filter 115 and then to a DC filter 120. Control is provided by an intermediate controller 125 and another controller 130, such as a TopSwitch model 233 controller manufactured by Power Integrations Inc., San Jose, Calif. A feedback controller 145 is connected between the controller 130 and a secondary filter 140. The secondary filter 140, along with the feedback controller 145 and the intermediate controller 125, are connected to the transformer 135.

In this manner, the power supply of the present invention incorporates two series high voltage DC capacitors to handle the rectified extremes of AC input voltage and incorporates a series FET (field effect transistor) switch in combination with the controller 130. In addition to the high power capability provided by this DC to DC converter configuration, the specific front end filtering (noise filter 115 and DC filter 120) allows the power supply to meet the conducted and radiated EMC specifications associated with European and American standards. The specific dithering control of the controller 130 combines with the front end filtering to meet the desired levels of electromagnetic field reduction.

The desired high power output that supports the analog cellular modem uses a direct secondary voltage sensing technique. The radio secondary supply voltage is sensed and coupled through an optical isolation circuit to achieve tight regulation over the differing load conditions. The sensing circuit is isolated from the primary DC voltage and ground where the controller 130 is located.

The analog cellular modem power supply is designed to allow extreme surge voltage conditions to be applied to the mains without failing the electronic devices or the passive devices. The power supply comprises a matched set of resistors, switching transistors, diodes, MOVs, capacitors, and associated printed circuit board layout, as shown in FIG. 2.

With respect to FIG. 2, the power supply is fed from a single phase input, shown as VA and VCOMMON. This voltage can be any voltage, and typically in the range between about 120 VAC and about 480 VAC in the meter. The AC voltage input is full-wave rectified by a rectifier (e.g., rectifier 105 in FIG. 1) comprising diodes D24, D25, D29, and D30. Resistor R65 and surge arrester V2 work in combination (e.g., as surge protector 110) to limit high voltage transient energy to the rest of the power supply.

Capacitor C5 and common-mode choke L1 provide high frequency filtering (e.g., as noise filter 115) that limits conducted interference from entering the power lines.

The wide-range, full-wave rectified voltage is filtered by the series capacitors C73 and C74 (e.g., DC filter 120) to create a DC voltage input for the switching circuit. Resistors R66, R68, R70, and R67 provide a leakage control for the DC series capacitors C73 and C74 to guarantee that the DC voltage divides equally between the two devices.

A switching regulator comprises transformer T1 (e.g., transformer 135 in FIG. 1), controller U18 (e.g., controller 130), optical feedback device U17 (e.g., feedback controller 145), intermediate switch Q1 (e.g., intermediate controller 125), and associated components. Assuming that the DC input voltage is less than 400 V, switch Q1 is driven through the input string of resistors R18, R24, R41, R44, and R32. With switch Q1 conducting, the regulator control is accomplished by controller U18 (e.g., controller 130), which can be a TopSwitch device from Power Integrations.

The controller U18 pulls pin 8 of transformer T1 to ground and allows current to flow through the primary winding, building energy into the winding and magnetics of transformer T1. For this cycle of control, secondary diodes D50 and D51 are reverse biased and current is primarily exclusively in the primary winding of transformer T1. When the controller U18 shuts off, the current in the transformer T1 primary winding attempts to keep flowing and the voltage on the winding reverses polarity. The reverse polarity is clamped by diode 43 and commutation zener D2. The reverse polarity voltage causes secondary current to flow through diode D51 and the main filter capacitor C72 (e.g., secondary filter 140 in FIG. 1). This cycle of the controller generates the 9.5 V secondary unregulated voltage.

A second winding is provided on the transformer T1 to simulate the output on the 9.5 V supply to the controller U18. This winding is fed through diode D50, filter capacitor C71, diode D48, and the optical isolator pass transistors in device U17. Control of device U17 output is determined by diodes D37, D49, and D52, and resistor R72 in combination with the optical diode. When the 9.5 V supply exceeds the junction of the diodes, current starts to flow that turns on the optical output transistors. The positive signal to the control pin of the controller U18 restarts the cycle by turning the controller U18 on and re-establishing primary current in the transformer T1.

The intermediate switch Q1 becomes active in the control of the regulator when the input DC voltage exceeds about 400 V. At this input level, voltage is split between the controller U18 and switch Q1 when the controller U18 turns off. This operation maintains the controller U18 and the intermediate switch voltage within their operating voltage ranges. As noted above, when the controller U18 turns on, switch Q1 also turns on, driven through the series string of input resistors. The resistor string is provided to handle the input transient voltage conditions.

The transformer T1 has an additional winding NC that is included as an internal shield for electromagnetic interference issues.

Capacitor C38 and resistor R62 are provided as snubber components to soften the switching edges of the secondary voltage and help reduce conducted and radiated emissions.

In FIGS. 1 and 2, although the analog cellular modem (comprising a modem board and a cellular radio shown as elements 317 and 307, respectively, in subsequent figures) is not shown, it is contemplated that the analog cellular modem would be fed (e.g., indirectly) from the 9.5 V DC output of the power supply. For example, a step down regulator would reduce the 9.5 V to the desired voltage (e.g., 5 V for both the modem board and the cellular radio). The modem board and cellular radio typically have multiple logic connections between each other, and the modem board has multiple logic connections to the main meter microprocessor (e.g., meter board 301 in the figures).

The printed circuit board on which the components are mounted is configured so that the power supply components having the most lost wattage are located at one end of the board. The components with the most significant power dissipation are switch Q1 and device U17. These components are desirably vertically mounted packages that are located in close proximity to the edge of the electronics housing so they can be captured by a power supply heatsink (element 325 in FIG. 5).

Figure 4:
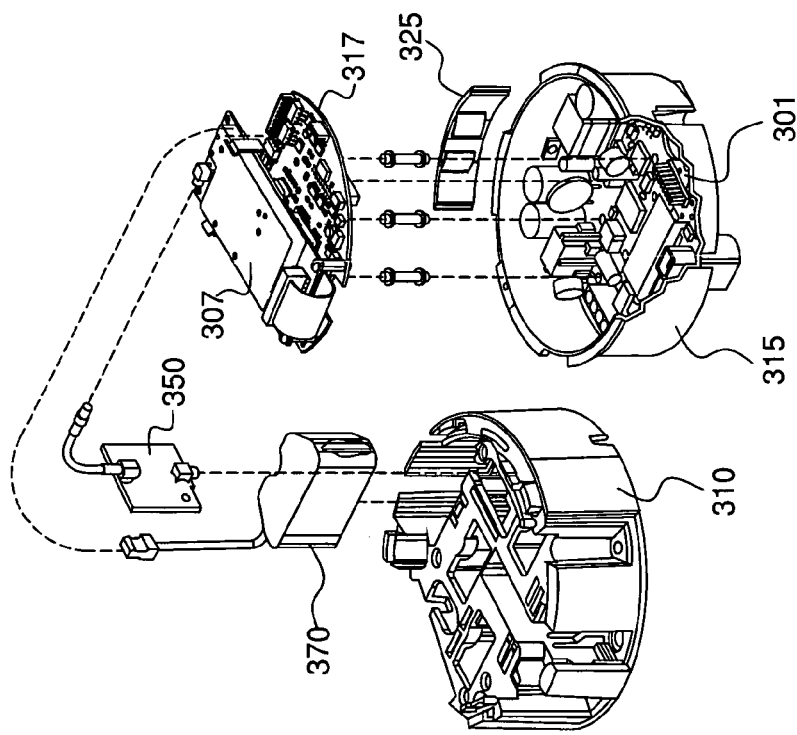
FIG. 4 is another perspective view of an exemplary meter, exploded, in accordance with the present invention.
Figure 3:
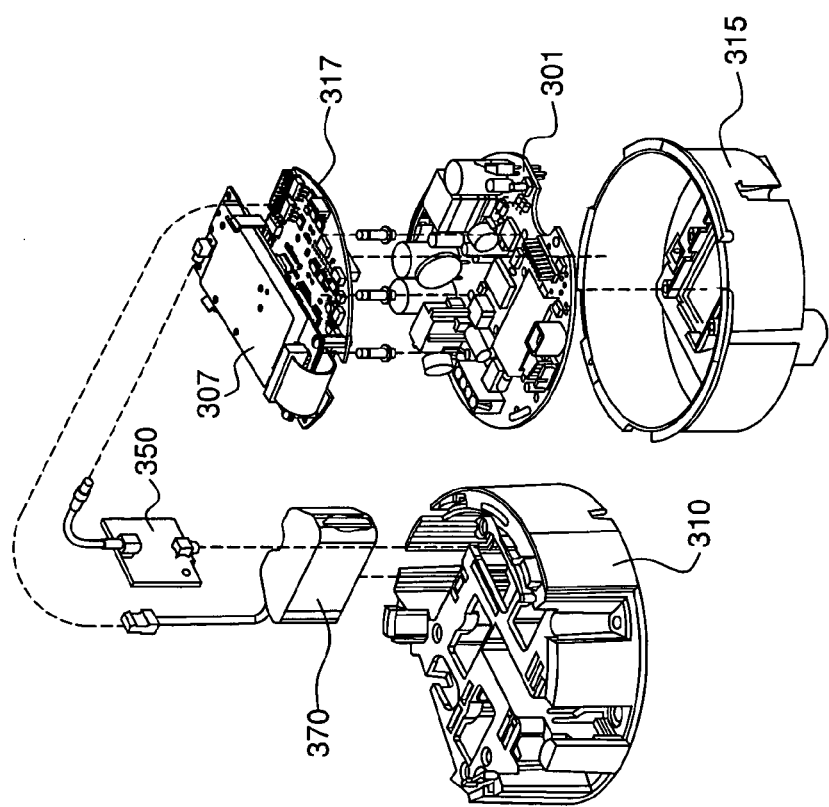
FIG. 3 is a perspective view of an exemplary meter, exploded, in accordance with the present invention.

FIG. 3 is a perspective view of an exemplary meter, exploded, in accordance with the present invention, and FIG. 4 is another perspective view of an exemplary meter, exploded, in accordance with the present invention. The meter comprises a main meter board 301 for performing the primary electrical energy processing (e.g., determining energy characteristics), an electronics housing module 315 in which the main meter board 301 and other components reside, and power supply heatsink 325 that attaches to the main meter board 301 (described in further detail with respect to FIG. 5). The meter further comprises a cellular radio 307 and a modem board 317, along with a battery 370 to power meter components such as the cellular radio 307 and modem board 317 in the event of an outage. The battery is preferably a lithium ion or lithium ion polymer battery. The meter also comprises an external antenna interface board 350 (described with respect to FIG. 10) and a current transformer housing 310 (described with respect to FIG. 11).

The exemplary meter incorporates several elements that enhance its steady state and transient thermal capabilities. The electronics housing module 315 preferably is molded with a thermally conductive plastic compound which improves the ability to extract heat from the electronic components (e.g., the main meter board 301, the cellular radio 307, and the modem board 317). Moreover, the main meter board 301 is configured so that the power supply components with the most lost wattage are located at the end of the board. A heatsink 325 is constructed to conduct the heat from the electronic devices to the electronics housing module 315. In addition, the modem board 317 is positioned in a manner that allows a modem or radio heatsink to be connected to a conductive material (e.g., a copper strap) that can conduct heat away from the cellular radio 307.

Furthermore, a thermally conductive but compressive material 320 (see FIG. 6) is disposed (preferably in at least two places) between the outside of the conductive electronics housing module 315 and the cover of the meter (not shown). For example, the thermally conductive but compressive material 320 can comprise a Berquist thermal pad or a Chromerics pad. A first desired location is associated with the power supply components and their heatsink 325 and the second desired location is associated with the heatsink from the analog cellular modem.

Figure 5:
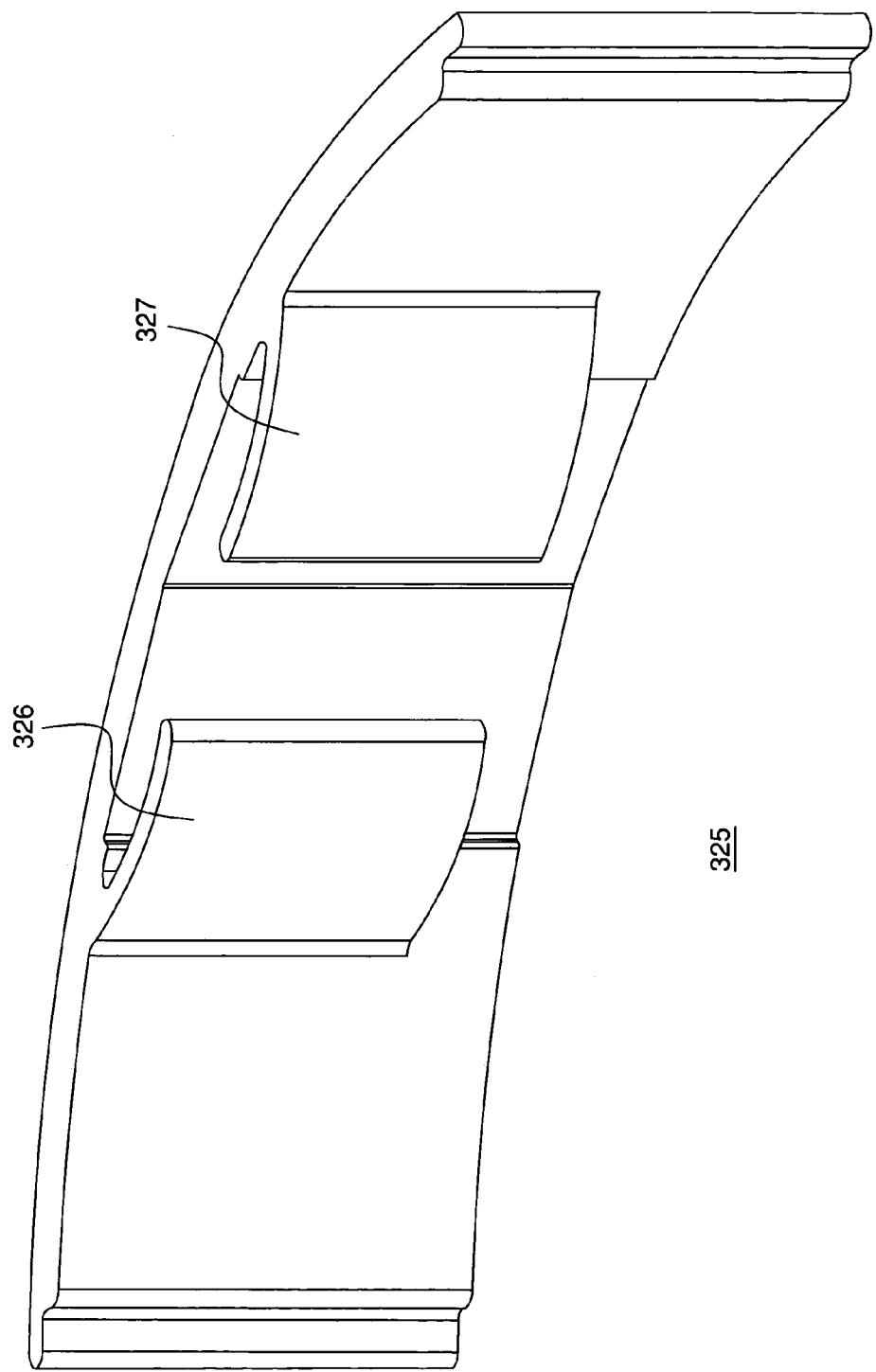
FIG. 5 is a perspective view of an exemplary power supply heatsink in accordance with the present invention.

FIG. 5 is a perspective view of an exemplary power supply heatsink 325 in accordance with the present invention. In FIG. 5, wing 326 captures switch Q1 and wing 327 captures device U17 (described above with respect to FIG. 2), although other configurations are contemplated. The heatsink 325 is constructed to conduct the heat from the electronic devices to the conductive electronics housing module 315. The heatsink 325 is preferably an extrusion that fits over the tabs of two power semiconductors associated with switch Q1 and device U17, respectively. The extrusion wings 326, 327 are preferably formed so a compression fit is achieved to the semiconductors when the heatsink 325 is installed. A rounded surface of the heatsink 325 desirably makes contact with the plastic of the electronics housing module 315. The electronics housing module 315 can comprise conductive plastic to aid in the conduction of heat from the power electronic components.

Figure 6:
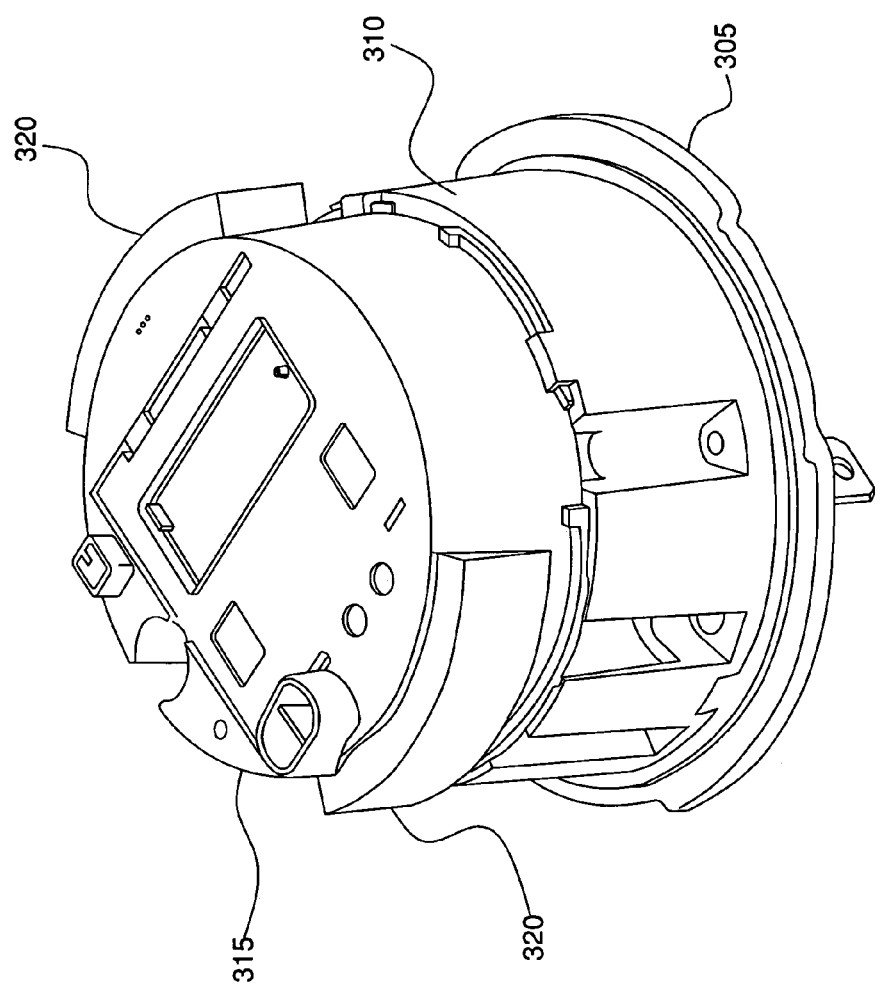
FIG. 6 is a perspective view of an exemplary meter in accordance with the present invention.
Figure 7:
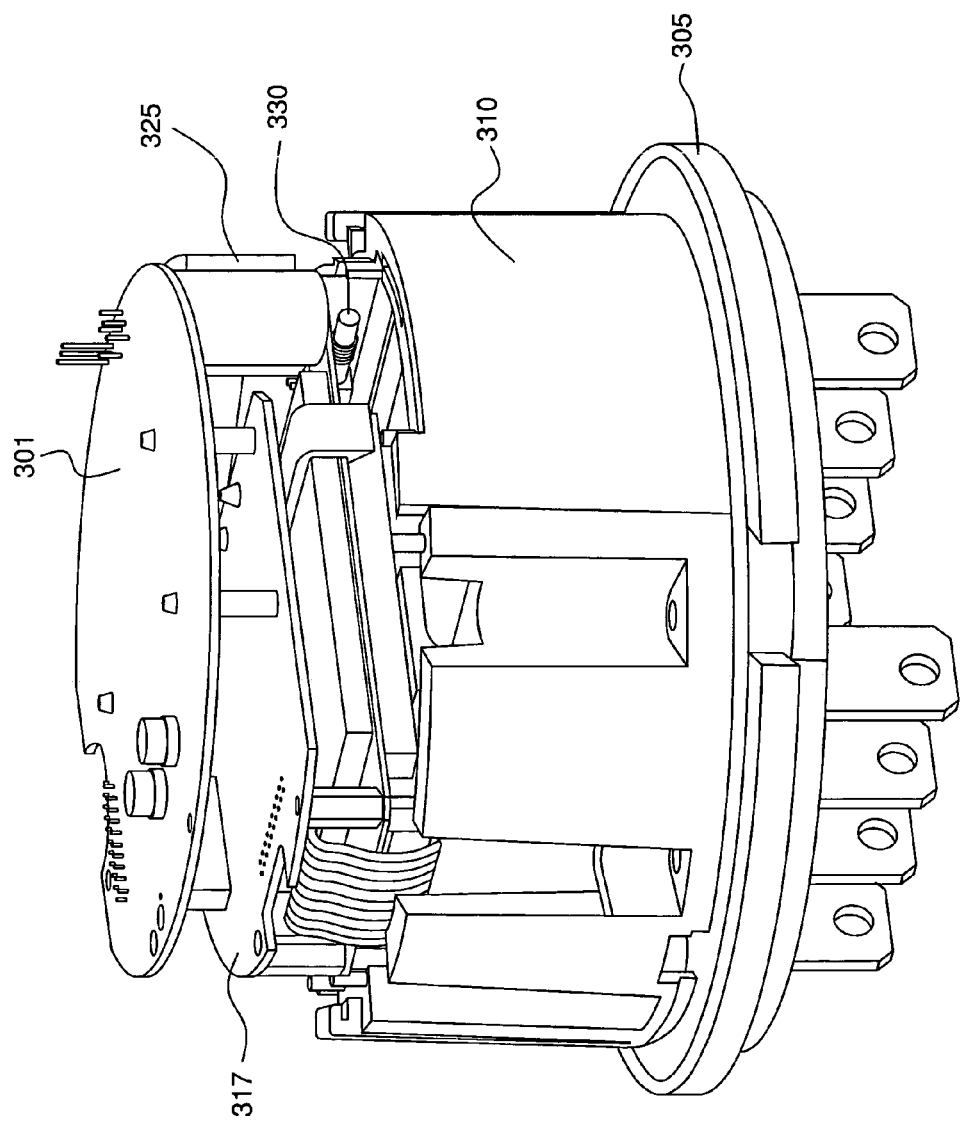
FIG. 7 is a perspective view of an exemplary meter with the electronics module removed, in accordance with the present invention.
Figure 8:
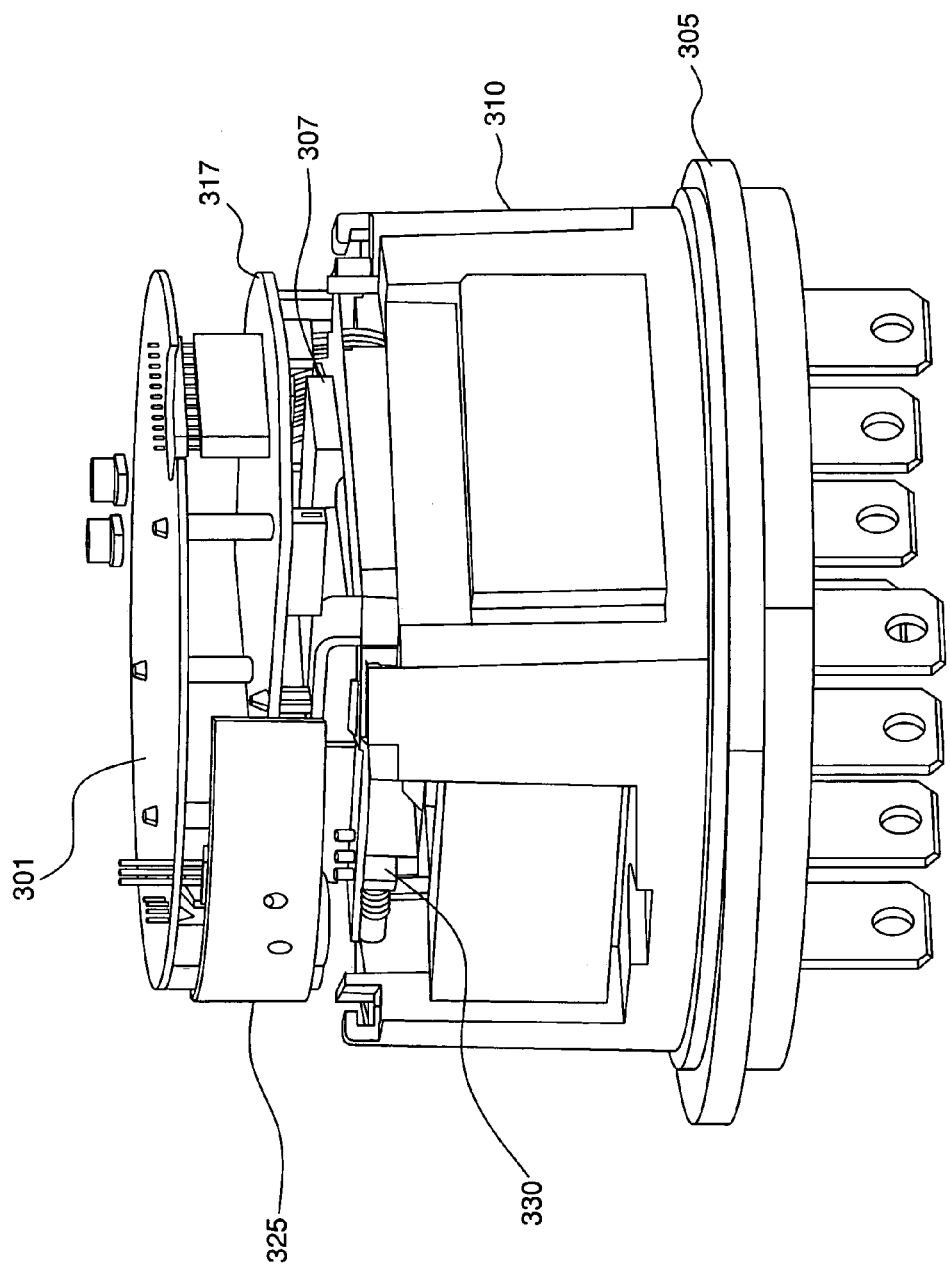
FIG. 8 is a side view of an exemplary meter with the electronics module removed, in accordance with the present invention.

FIG. 6 is a perspective view of an exemplary meter, assembled (without a cover), in accordance with the present invention. FIG. 7 is a perspective view of an exemplary meter with the electronics module 315 removed, in accordance with the present invention. FIG. 8 is a side view of an exemplary meter with the electronics module 315 removed, in accordance with the present invention. A meter base 305 receives and supports a current transformer housing 310, which is contained within an electronics housing module 315. Also contained within the electronics housing module 315 is the main meter board 301 and the analog cellular modem, disposed in an arrangement as shown in FIGS. 3 and 4, for example.

A thermally conductive material 320 is disposed between the electronics housing module 315 and an outside meter cover (not shown). Preferably, the conductive material 320 is at least two separate parts, disposed on opposing sides of the electronics housing module 315. As noted above, the material 320 preferably is compressive in addition to being thermally conductive. The conductive material 320 acts to transport heat away from the internal electronic components to the outside meter cover.

The analog cellular modem, preferably comprising cellular radio 307 and modem board 317, are also disposed in the electronics housing 315. In FIGS. 7 and 8, the radio 307 is shown next to the current transformer housing 310 and the modem board 317 is just above the radio 307. An RF module 330 is provided to allow RF communications with the meter. An exemplary RF module 330 can comprise a CRM 4200 AMPS radio, that is EIA IS-19B and EIA IS-553A compliant. The RF module 330 preferably can receive and/or originate calls. Moreover, the RF module 330 preferably can be polled by a master station for meter reads, and can call back on a schedule or for exceptional conditions.

Figure 9:
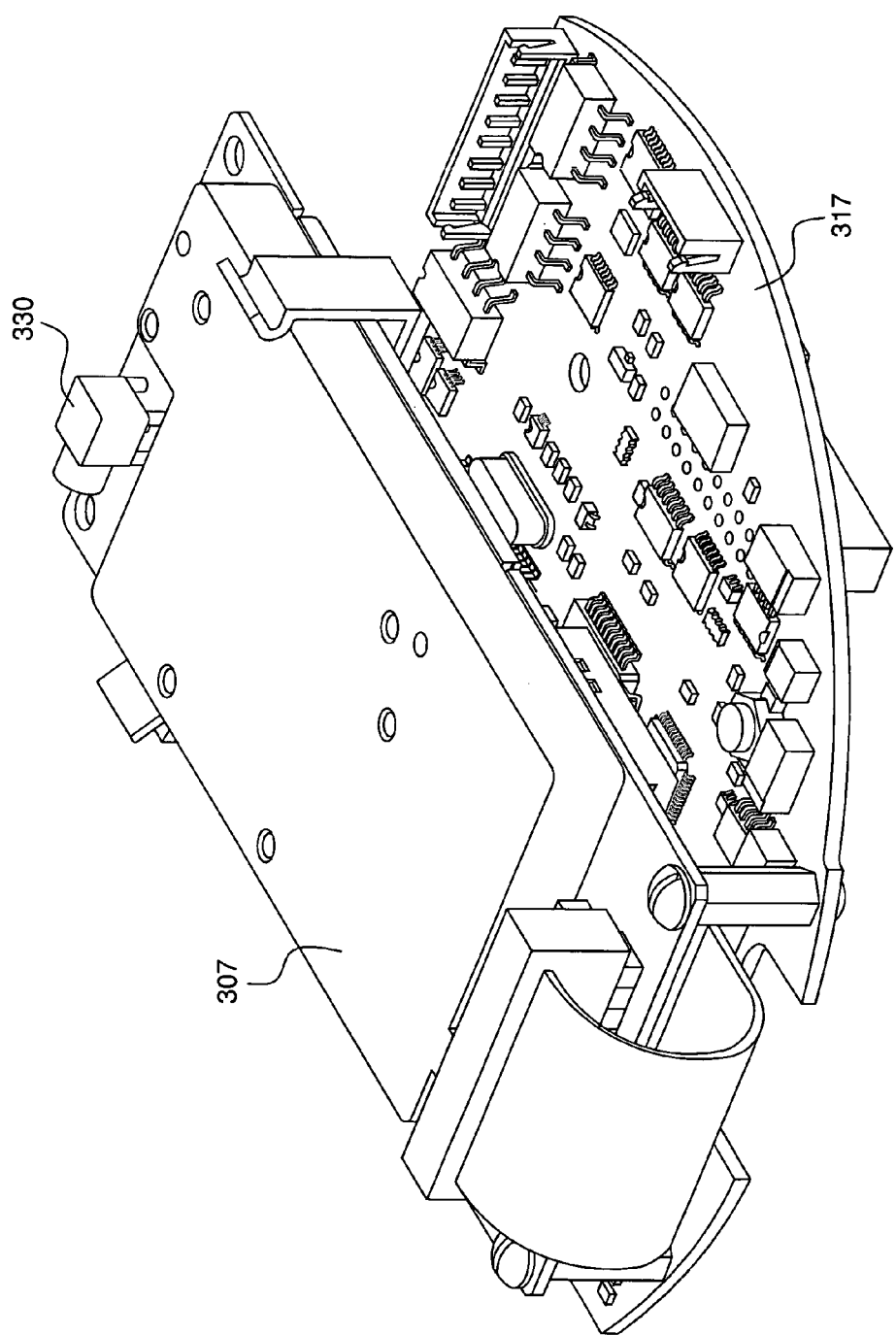
FIG. 9 is a perspective view of an exemplary cellular radio and modem board in accordance with the present invention.

FIG. 9 is a perspective view of an exemplary cellular radio and modem board (e.g., elements 307 and 317, respectively, in FIG. 4) in accordance with the present invention. The modem 317 is desirably a separate board that provides a logic interface between the meter microprocessor (residing on the main meter board 301, for example) and the radio 307. The modem 317 handles the protocol conversion between the over-the-air protocol of the radio 307 and the meter. The meter either sends commands (e.g., "AT" commands) to the modem 317 to direct communications or sends/receives data that is passed through from the radio 307 to the modem 317 to the meter. The term "analog cellular radio" refers to the radio transceiver that does the over-the-air messaging and includes a transmitter for sending signals to a cellular tower (not shown).

A radio heatsink (not shown in FIG. 9) attaches directly to the flat surface of the radio 307. The radio heatsink is desirably connected to a conductive material (e.g., copper strap) that can conduct heat away from the radio 307. The radio heatsink is another extrusion that bolts to the radio and has an extension that reaches outside the contour of the current transformer housing 310 to make contact with the outer cover of the meter. This heatsink arrangement allows additional conduction to occur from the radio 307 to the outside ambient, through the meter cover.

Figure 10:
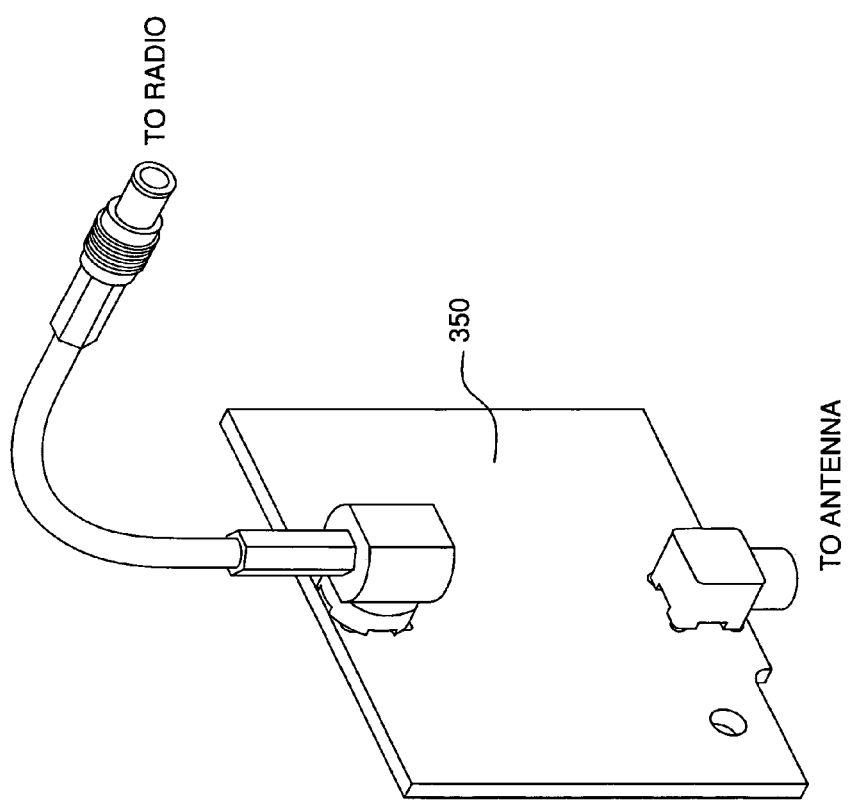
FIG. 10 is a perspective view of an exemplary external antenna interface board in accordance with the present invention.

FIG. 10 is a perspective view of an exemplary external antenna interface board (e.g., interface board 350 in FIG. 4) in accordance with the present invention. The isolated external antenna interface board 350 is located in the current transformer housing 310, and thus is not shown in FIGS. 6–8. The interface board 350 interfaces an external antenna (not shown) to the radio 307. The external antenna is physically located separate from the meter enclosure. The antenna is preferably located on an elevated structure somewhere in the vicinity of the meter package to improve two-way signaling. The antenna interface board 350 preferably is capable of handling a variety of radios while providing about 4000 VAC of voltage isolation. The antenna interface board 350 preferably maintains very low attenuation for receive and transmit RF signals.

Figure 11:
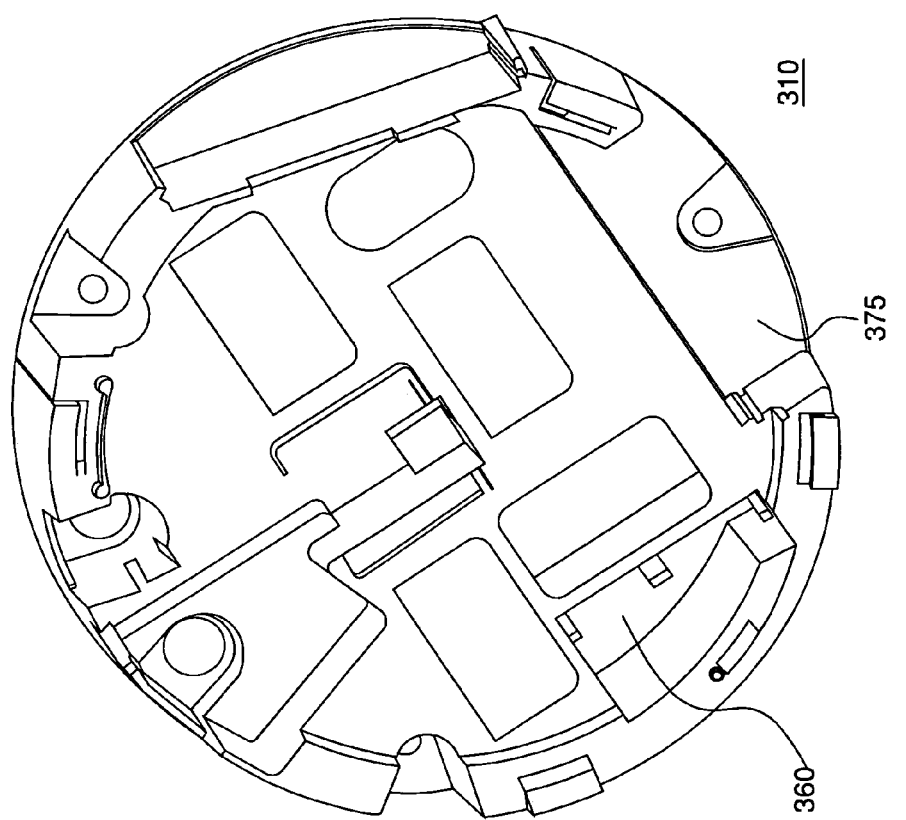
FIG. 11 is a perspective view of an exemplary current transformer housing in accordance with the present invention.

FIG. 11 is a perspective view of an exemplary current transformer housing (e.g., housing 310 from FIG. 4) in accordance with the present invention, and does not show the modem or the radio. The current transformer housing 310 is an enclosure for various meter components and has clearance for the modem and radio, a mounting location 375 for a battery 370, a mounting location for the external antenna interface board, allows multiple cable exits through the meter base, and provides expansion capabilities with new board guides. The current transformer housing 310 comprises an opening or slot 360 that houses the external interface board 350. Preferably, the board 350 snaps into place in the housing 310.

The thermal test results associated with the exemplary meter have proven to be excellent for steady state rise due to idle conditions, heat rise due to lengthy transmit conditions and steady state heat rise due to sun loading, for example, when the meter is installed outdoors in various types of midday conditions. The meter thus comprises an analog cellular modem that can be operated under the cover of the meter in severe outdoor applications.

Although illustrated and described herein with reference to certain specific embodiments, the present invention is nevertheless not intended to be limited to the details shown. Rather, various modifications may be made in the details within the scope and range of equivalents of the claims without departing from the invention.

What is claimed is:

1. An electronic energy meter, comprising:
   an electronics housing module comprising:
      an analog cellular modem;
      a power supply in electrical connection with the analog cellular modem; and
      a current transformer housing positioned to receive the analog cellular modem and a battery.

2. The electronic energy meter of claim 1, further comprising a power supply heatsink connected between the power supply and the electronics housing module.

3. The electronic energy meter of claim 1, wherein the analog cellular modem comprises a cellular radio in electrical connection with a modem board.

4. The electronic energy meter of claim 3, further comprising an RF module disposed on the cellular radio.

5. The electronic energy meter of claim 1, wherein the power supply comprises a front end connected to receive an input voltage, and a switching regulator to provide an output voltage to the analog cellular modem.

6. The electronic energy meter of claim 5, wherein the front end comprises a rectifier connected to receive the input voltage, a surge protector to receive a rectified signal from the rectifier, and a filtering circuit to filter an output signal of the surge protector and provide a filtered signal to the switching regulator, and the switching regulator comprises a transformer, a feedback device, an intermediate switch, and a controller.

7. The electronic energy meter of claim 6, further comprising a power supply heatsink connected between the feedback device and the intermediate switch of the power supply and the electronics housing module.

8. The electronic energy meter of claim 1, further comprising an external antenna interface board connected to the analog cellular modem.

9. The electronic energy meter of claim 1, further comprising a thermally conductive and compressive material disposed on a portion of the outer surface of the electronics housing module.

10. The electronic energy meter of claim 9, wherein heat generated by the power supply and the analog cellular modem is conducted outside of the electronic energy meter via the electronics housing module and the thermally conductive and compressive material.

11. The electronic energy meter of claim 1, wherein the power supply is capable of delivering power over a range of AC input voltages between about 90 VAC and about 530 VAC.

12. An electronic energy meter, comprising:
    an integral analog cellular modem;
    a power supply in electrical connection with the analog cellular modem capable of delivering power over a range of AC input voltages between about 90 VAC and about 530 VAC; and
    a current transformer housing positioned to receive the analog cellular modem and a battery.

13. The electronic energy meter of claim 12, further comprising an electronics housing module at least partially containing the analog cellular modem and the power supply.

14. The electronic energy meter of claim 13, further comprising:
    a power supply heatsink connected between the power supply and the electronics housing module to conduct heat from the power supply; and
    a thermally conductive and compressive material disposed on a portion of the outer surface of the electronics housing module wherein heat generated by the power supply and the analog cellular modem is conducted outside of the electronic energy meter via the electronics housing module and the thermally conductive and compressive material.

15. The electronic energy meter of claim 12, wherein the analog cellular modem comprises a cellular radio and a modem board.

16. The electronic energy meter of claim 12, wherein the analog cellular modem comprises an RF module.

17. The electronic energy meter of claim 12, wherein the power supply comprises:
    a front end comprising:
       a rectifier connected to receive an input voltage,
       a surge protector to receive a rectified signal from the rectifier, and
       a filtering circuit to filter an output signal of the surge protector; and
    a switching regulator that receives a filtered signal from the filtering circuit and provides an output voltage to the analog cellular modem.

18. The electronic energy meter of claim 12, further comprising an external antenna interface board connected to the analog cellular modem.

* * * * *